(12) United States Patent
Giacometti et al.

(10) Patent No.: US 9,657,760 B2
(45) Date of Patent: May 23, 2017

(54) DEVICE FOR FIXING A PANEL IN A SUPPORT RAIL

(71) Applicant: SB INGÉNIERIE, Poisy (FR)

(72) Inventors: Sylviane Giacometti, Choisy (FR); Cyril Dagand, Rumilly (FR)

(73) Assignee: SB INGÉNIERIE, Poisy (FR)

( * ) Notice: Subject to any disclaimer, the term of this patent is extended or adjusted under 35 U.S.C. 154(b) by 107 days.

(21) Appl. No.: 14/619,880

(22) Filed: Feb. 11, 2015

(65) Prior Publication Data

US 2015/0240851 A1    Aug. 27, 2015

(30) Foreign Application Priority Data

Feb. 26, 2014    (FR) ...................................... 14 00483

(51) Int. Cl.
*B25G 3/20*    (2006.01)
*F16B 2/14*    (2006.01)
*F16B 2/18*    (2006.01)
*F16B 7/04*    (2006.01)
(Continued)

(52) U.S. Cl.
CPC .......... *F16B 9/023* (2013.01); *E04F 11/1812* (2013.01); *E04F 11/1853* (2013.01); *F16B 2/14* (2013.01); *E04F 2011/1823* (2013.01); *Y10T 403/7064* (2015.01); *Y10T 403/7067* (2015.01)

(58) Field of Classification Search
CPC ......... Y10T 403/7064; Y10T 403/7067; F16B 2/14; F16B 9/023; E04F 11/18; E04F 11/1812; E04F 11/1853; E04F 2011/1823; E06B 3/54; E06B 3/5454; E06B 3/585; E06B 3/5864

USPC ........... 403/374.1, 374.3; 52/204.64, 204.65, 52/716.8, 800.12–800.14, 800.18
See application file for complete search history.

(56) References Cited

U.S. PATENT DOCUMENTS 4,671,016 A * 6/1987 Boeckx ................. E06B 3/5454
                                                                        49/388
4,793,110 A * 12/1988 Tucker ..................... E02D 27/00
                                                                        248/188.4
(Continued)

FOREIGN PATENT DOCUMENTS

DE    202007009239 U1    9/2007
DE    102009008307 A1    10/2009
(Continued)

*Primary Examiner* — Michael P Ferguson
*Assistant Examiner* — Nahid Amiri
(74) *Attorney, Agent, or Firm* — Oliff PLC

(57) ABSTRACT

A fixing device of a panel in a support rail, which includes a section having a U-shaped groove equipped with a rounded bottom and with two divergent ramps arranged at the apex of the two opposite wings of the section. The device enables the panel to be secured and adjusted vertically by means of a cradle straddling the bottom edge of the panel. The cradle is configured to snugly follow the conjugate shape of the bottom of the groove allowing a rocking movement of small amplitude when angular adjustment is performed. At least one wedging module comprising two adjustment screws collaborating with a first positioning wedge able to slide on the cradle and a second positioning wedge able to move along the corresponding ramp for bilateral clamping of the panel after said adjustment, are arranged on each side of the panel.

10 Claims, 8 Drawing Sheets

(51) Int. Cl.
*F16B 9/02* (2006.01)
*E04F 11/18* (2006.01)

(56) References Cited

U.S. PATENT DOCUMENTS

| | | | | |
|---|---|---|---|---|
| 5,551,205 A * | 9/1996 | Kidder | ................. | E04H 17/163 |
| | | | | 52/716.8 |
| 6,517,056 B2 * | 2/2003 | Shepherd | ............ | E04F 11/1851 |
| | | | | 256/24 |
| 7,954,289 B2 * | 6/2011 | Evans | ................. | E04H 12/2269 |
| | | | | 248/530 |
| 7,963,077 B2 * | 6/2011 | Lin | ........................... | E06B 3/72 |
| | | | | 52/204.591 |
| 8,181,405 B2 * | 5/2012 | Nash | ................. | E04F 11/1851 |
| | | | | 52/127.8 |
| 8,826,621 B2 * | 9/2014 | Noble | ................. | E04F 11/1851 |
| | | | | 52/584.1 |
| 8,925,258 B1 * | 1/2015 | Header | ................. | E05D 15/00 |
| | | | | 16/90 |
| 2006/0070318 A1 * | 4/2006 | Chen | .................... | E06B 3/5454 |
| | | | | 52/204.65 |
| 2013/0248792 A1 | 9/2013 | Bangratz | | |

FOREIGN PATENT DOCUMENTS

| | | |
|---|---|---|
| DE | 202010016187 U1 | 2/2011 |
| EP | 1647663 A1 | 4/2006 |
| FR | 2930270 A1 | 10/2009 |
| WO | 2013121330 A2 | 8/2013 |

* cited by examiner

DEVICE FOR FIXING A PANEL IN A SUPPORT RAIL

BACKGROUND OF THE INVENTION

The invention relates to a fixing device of a panel in a receiving groove of a support rail in the form of a U-shaped section extending in the longitudinal direction, said device comprising wedging means collaborating with two adjustment screws to perform vertical securing of the panel in the groove of the support rail, said U-shaped groove being equipped with a rounded bottom and with two divergent ramps arranged at the apex of the opposite two wings of the section, the wedging means having a cradle straddling the bottom edge of the panel to snugly follow the conjugate shape of the bottom of the groove allowing a rocking movement of small amplitude when angular adjustment is performed.

STATE OF THE ART

The documents EP 1647663, FR 2930270 and DE 102009008307 concern screw adjustment and clamping systems collaborating with shims in the form of a wedge or a cam to adjust the verticality and clamping of a glass panel in a section. The verticality adjustment and clamping operations of the panel do nevertheless remain complicated and require the use of sections having specific structures.

OBJECT OF THE INVENTION

The object of the invention consists in providing a fixing device of a panel in a rail that is able to be angularly adjusted and clamped with precision and speed to obtain bilateral clamping of the panel.

The fixing device according to the invention is characterized in that the wedging means comprise a first and a second positioning wedge on each side of the panel, said first positioning wedge of each side collaborating with a cradle and said second positioning wedge of each side being able to move along the corresponding ramp for bilateral clamping of the panel after said adjustment has been performed.

The cradle and the two pairs of positioning wedges, with the two adjustment screws, constitute a wedging module which can be either pre-assembled on the bottom part of the panel before insertion of the latter in the groove of the section or be pre-positioned in the bottom of the groove in order to subsequently receive the panel.

The rocking amplitude of the cradle is limited by the first positioning wedges coming into engagement against the two lateral surfaces of the groove.

Stops are configured to prevent the cradle from riding up when tightening of the adjustment screws is performed.

It is clear that the number of wedging modules is variable according to the length of the panel.

Preferably, the first positioning wedge comprises an aperture in which the adjustment screw is pre-assembled and an extension engaged vertically along a ramp arranged in each of the two wings of the cradle.

Advantageously, the two positioning wedges are separated vertically from one another by a space on each side of the panel so as to move by sliding in two opposite directions when clamping of the adjustment screw is performed.

BRIEF DESCRIPTION OF THE DRAWINGS

Other advantages and features will become more clearly apparent from the following description of an embodiment of the invention given for non-restrictive example purposes only and represented in the appended drawings in which.

DETAILED DESCRIPTION OF AN EMBODIMENT

Figure 1:
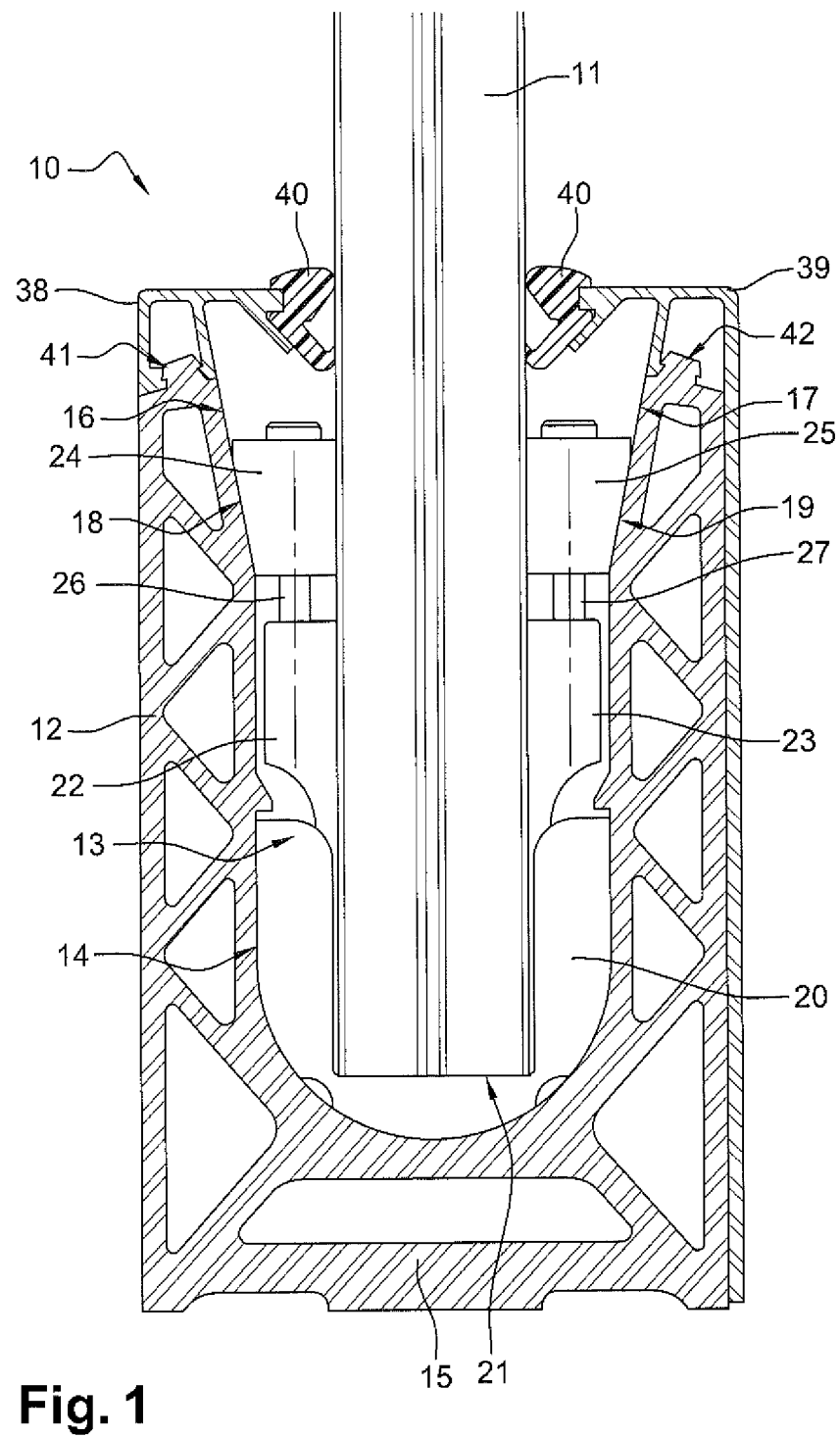
FIG. 1 is a schematic cross-sectional view of the bottom part of a guard rail using the fixing device according to the invention.

FIG. 1 illustrates a partial view of a fixing device 13 of a panel 11 in a support rail 12, in particular for a guard rail 10 or any other type of separating or safety wall. In the case of a guard rail 10, panel 11 is preferably made from glass and is secured vertically in support rail 12 by fixing device 13.

Support rail 12 is formed for example by an aluminium section having a U-shaped cross-section delineating, on the inside, a groove 14 for receiving panel 11 and fixing device 13. The section extends in continuous manner in the longitudinal direction and comprises a horizontal base part 15 designed to press on and be secured to a slab or structure made from concrete or stone or metal (not shown).

The bottom of groove 14 presents a preferably rounded, concave curved shape, extended by two internal lateral surfaces 16, 17 arranged vertically and parallel to one another. The width of groove 14 between the two lateral surfaces 16, 17 is larger than the thickness of panel 11. The two internal lateral surfaces 16, 17 are tapered at the apex of the section so as to form two divergent terminal ramps 18, 19.

Figure 2A:
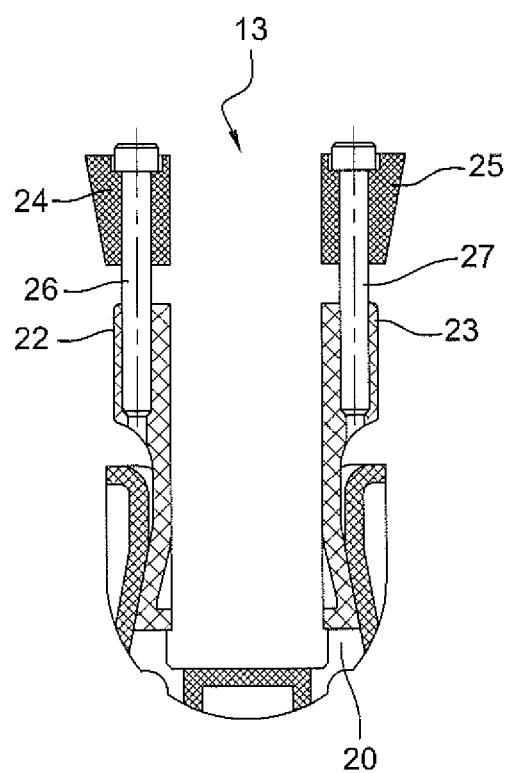
FIGS. 2A and 3A represent elevational and side views of a fixing device of FIG. 1.
Figure 3A:
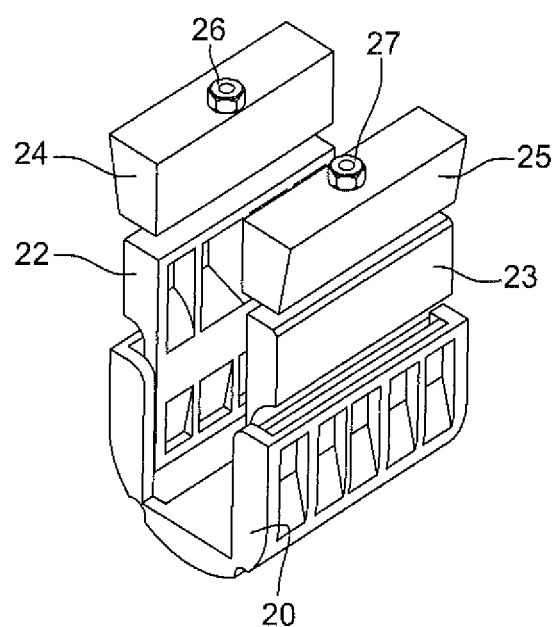
Figures 2B, 3B:
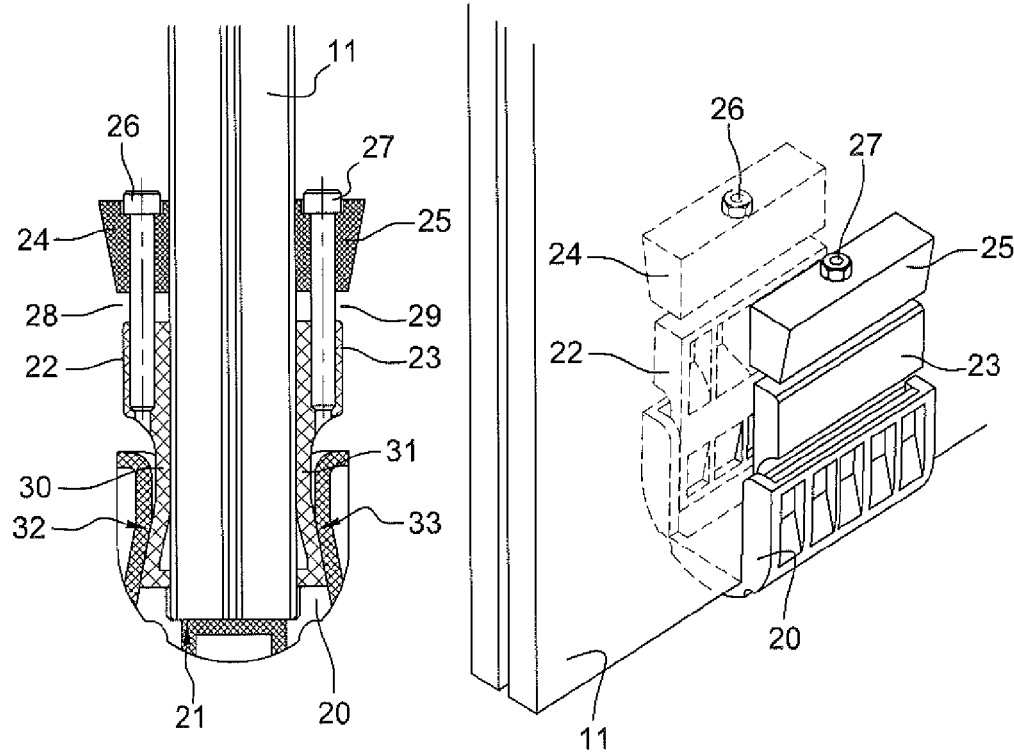
FIGS. 2B and 3B show the panel equipped with the fixing device before the latter is fitted in place in the groove of the support rail.

In FIGS. 2 and 3, fixing device 13 comprises a cradle 20 straddling the bottom edge 21 of panel 11 to allow a rocking movement of small amplitude when the verticality of panel 11 is adjusted after the latter has been inserted in the section. U-shaped cradle 20 is made from plastic and is configured to snugly follow the conjugate shape of the bottom of the section and to fill the transverse clearance between the opposite surfaces of panel 11 and the bottom part of groove 14.

A first positioning wedge 22, 23, above which there is a second positioning wedge 24, 25, able to be adjusted in the heightwise direction by means of an adjustment screw 26, 27, are located above cradle 20 on each side of the opposite surfaces of panel 11. A space 28, 29 separates first positioning wedge 22, 23 vertically from second positioning wedge 24, 25. Fixing screw 26, 27 passes through space 28, 29 and comprises a threaded end pre-fitted in a tapped aperture of first positioning wedge 22, 23. The latter is extended by an extension 30, 31 coming into engagement with a ramp 32, 33 arranged in each of the two wings of cradle 20.

Figure 4:
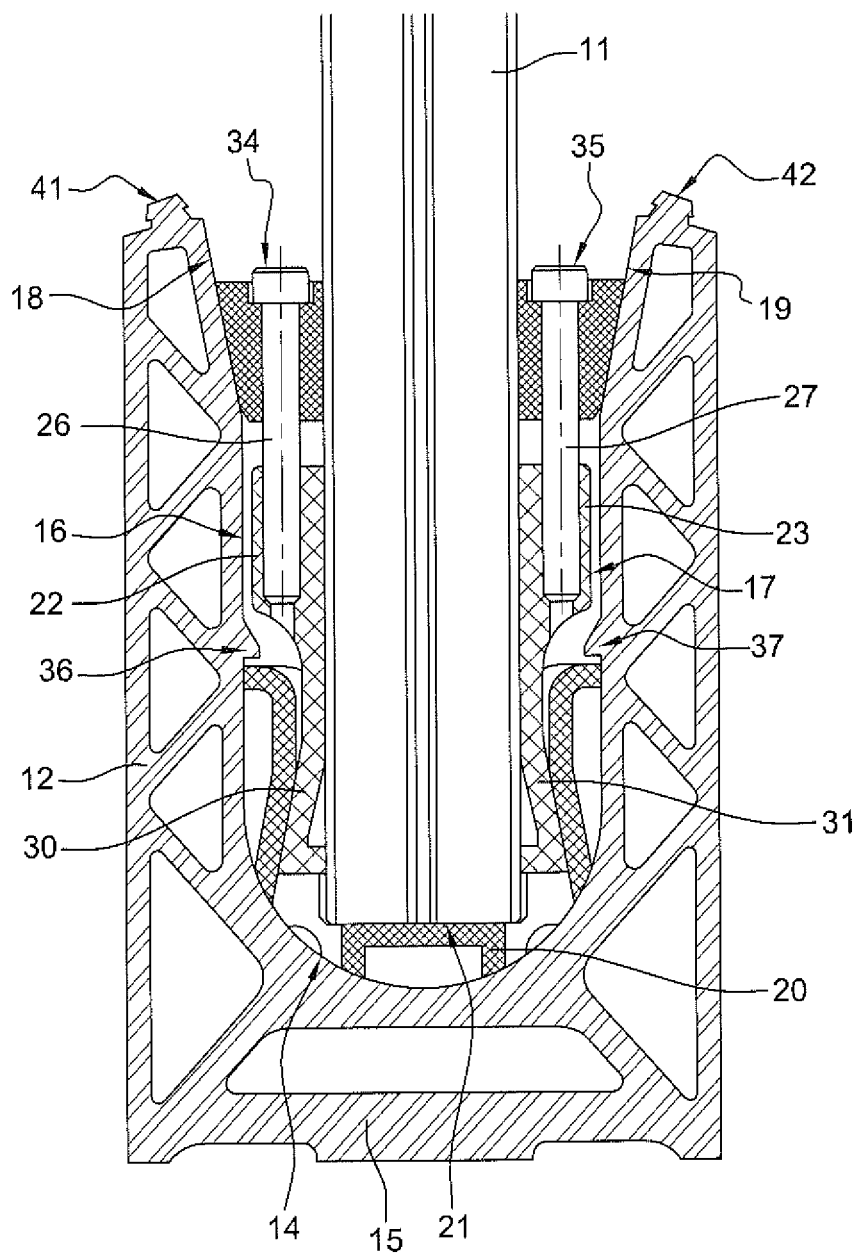
FIGS. 4 and 5 are similar cross-sectional views to FIG. 1, respectively at the end of insertion of the panel in the rail and when angular adjustment is performed.

In FIG. 4, each second positioning wedge 24, 25 is equipped with a flat internal surface coming into contact with the corresponding lateral surface of panel 11, and an inclined external surface designed to collaborate with ramp 18, 19 of the section. Adjustment screw 26, 27 passes through second positioning wedge 24, 25, and the head 34, 35 of the screw is housed in a counterbore situated in the top surface of said second wedge.

The different positioning wedges 22 to 25 are made from plastic and are preassembled with cradle 20 and the two adjustment screws 26, 27 to constitute a wedging module serving the purpose of securing panel 11. It is clear that the number of wedging modules can vary according to the length of panel 11.

The adjustment and securing operations of panel 11 by means of fixing device 13 are performed in the following way:

In FIG. 4, panel 11 equipped with the wedging module of FIGS. 2 and 3 is inserted by sliding in groove 14 of the aluminium section of support rail 12. The wedging module slides along internal surfaces of groove 14 and enables vertical pre-positioning of panel 11 in support rail 12. Cradle 20 is loaded downwards against the bottom by the weight of panel 11, and second positioning wedges 24, 25 are in engagement with ramps 18, 19 of the section.

Figure 8:
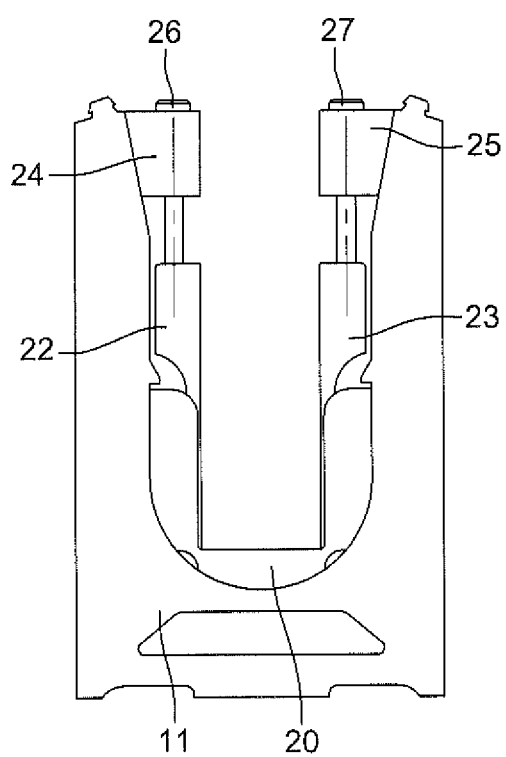
FIGS. 8 and 9 show identical views to FIGS. 2B and 3B, following prior fitting of the fixing device in the groove of the rail, without the panel.
Figure 9:
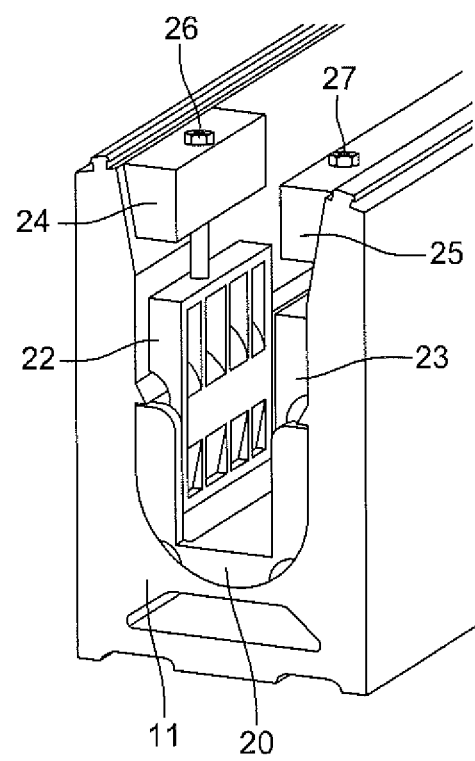

According to the variant of FIGS. 8 and 9, the wedging module is first inserted in the groove of support rail 12 so as to press cradle 20 against the bottom of the rail. Fitting of panel 11 is then performed after installation of the wedging module or modules.

Panel 11 is adjusted by hand in order to position it correctly, in particular in alignment with respect to a predefined reference frame.

Figure 5:
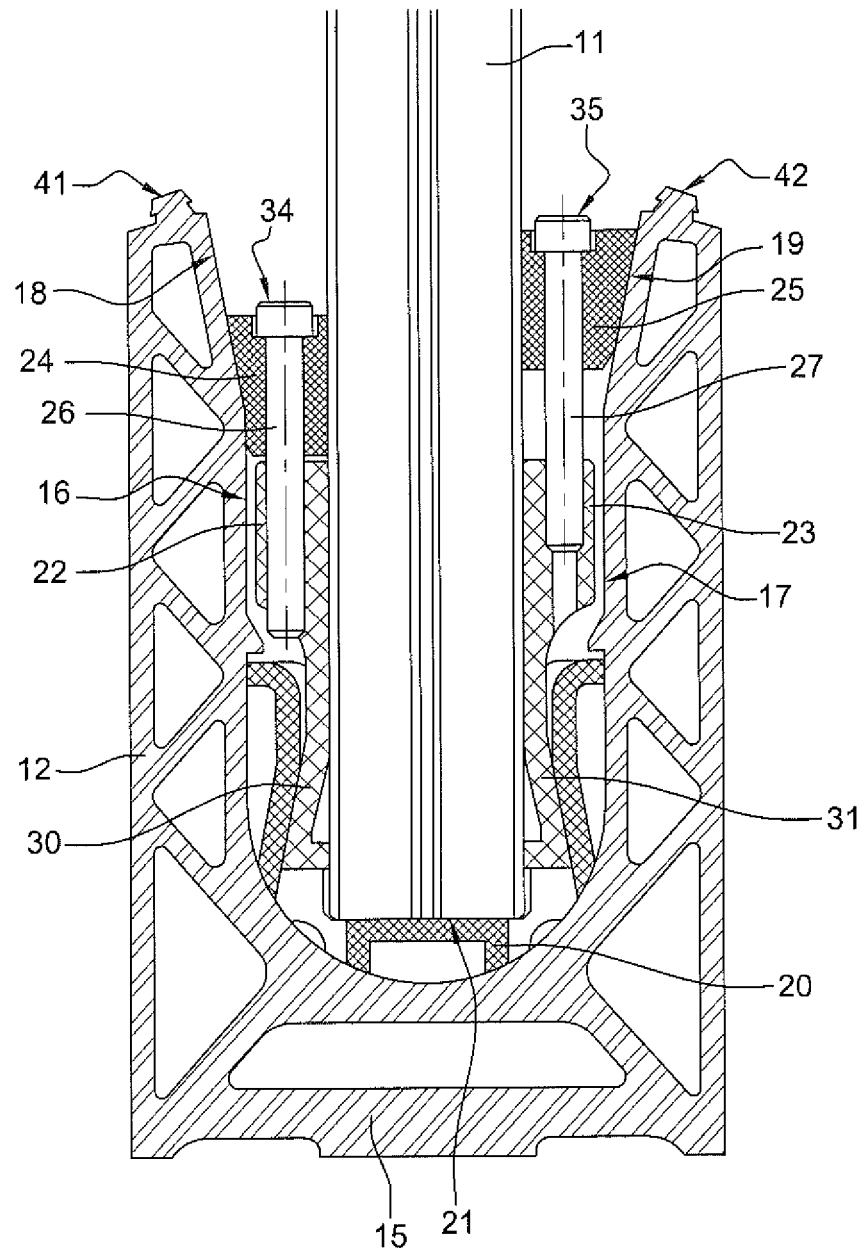

In FIG. 5, angular adjustment of panel 11 is performed by tightening or slackening adjustment screws 26, 27 causing a rocking movement of cradle 20 in a predefined direction to enable longitudinal alignment of the glass panels when fitting of the latter is performed. The amplitude of rocking of cradle 20 is very small, about +/−1° with respect to the vertical mid-plane, due to the fact that first wedges 22, 23 come up against the stop formed by one of the two lateral surfaces of groove 14. It can be seen in FIG. 5 that slackening of screw 27 makes the right-hand wedge 25 move upwards and slackening of screw 26 results in left-hand wedge 24 being moved downwards. In this case, panel 11 rocks slightly in the clockwise direction.

Figure 7:
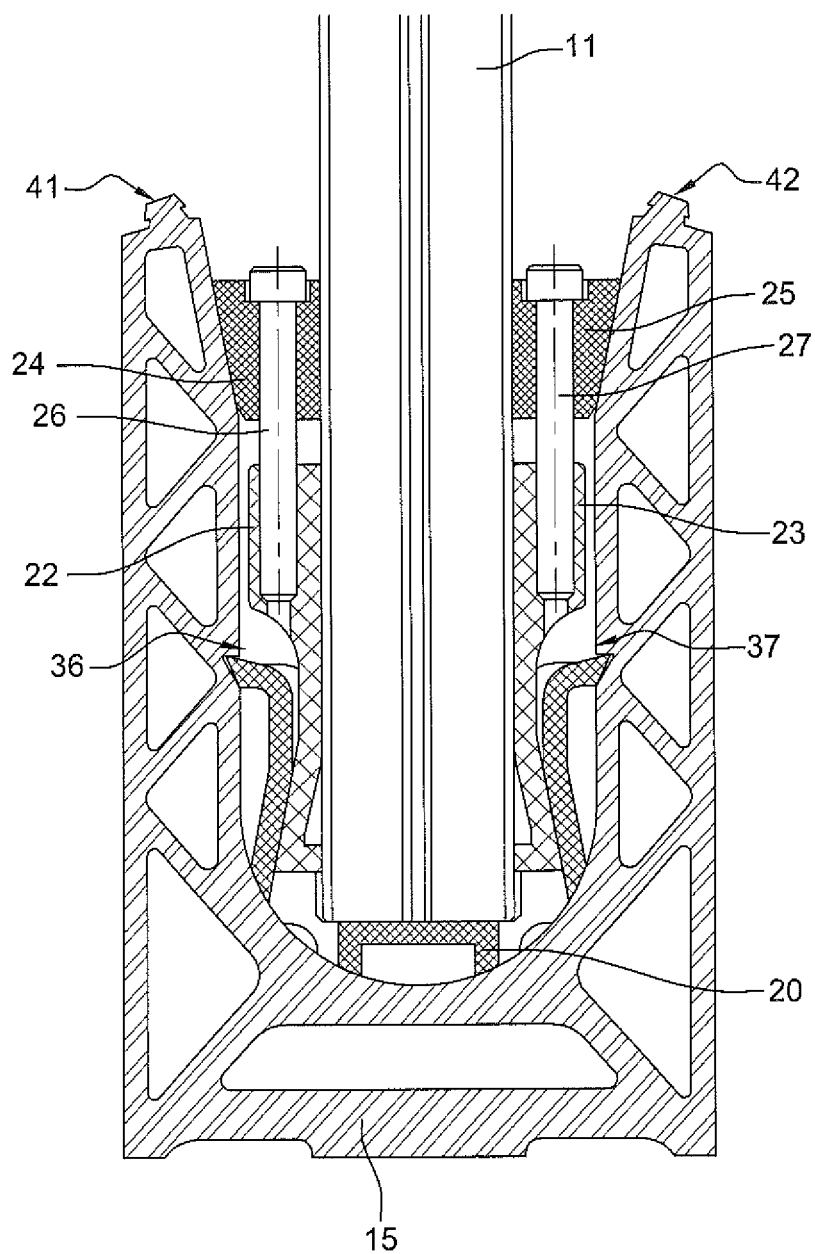
FIG. 7 is an identical view to FIG. 6 of an alternative embodiment with inversion of the cradle stops.

In FIG. 4, stops 36, 37 are configured to prevent cradle 20 from rising up when clamping of adjustment screws 26, 27 is performed. Stops 36, 37 are formed by protuberances integral to the lateral surfaces of groove 14 of the rail. In FIG. 7, stops 36, 37 are inverted with respect to FIG. 4, as they are formed by extensions of cradle 20 designed to engage in notches arranged in the side walls of groove 14.

Figure 6:
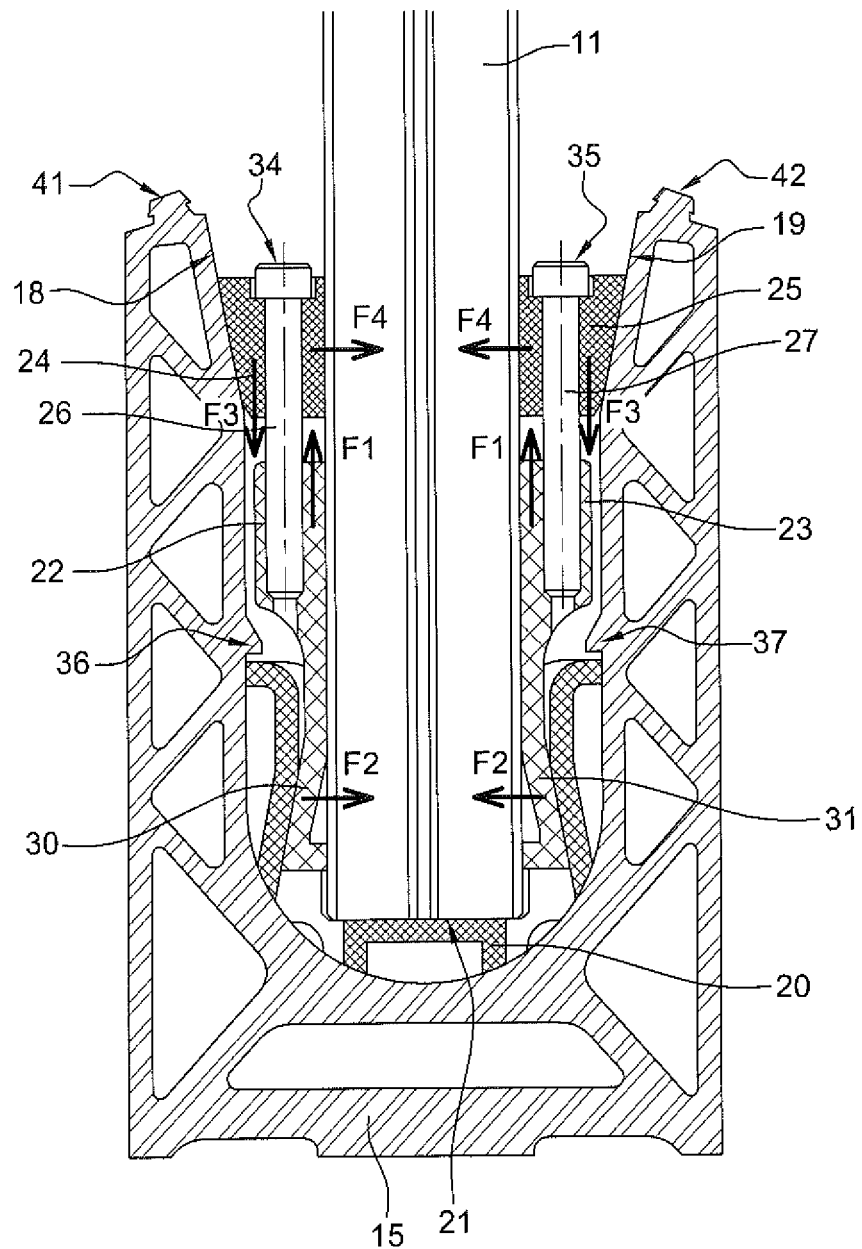
FIG. 6 illustrates bilateral clamping of the panel at the end of tightening of the two screws.

After adjustment of the verticality, securing of panel 11 in the adjusted position is then performed (FIG. 6). Tightening of the two screws 26, 27 is performed on each side of panel 11 so as to obtain progressive clamping in groove 14 of the section. First positioning wedges 22, 23 move upwards in the direction of arrows F1, which takes up the clearances and results in clamping of panel 11 at the bottom part following the pressure exerted by extensions 30, 31 (see arrows F2). When tightening is performed, downward movement of second positioning wedges 24, 25 along ramps 18, 19 (see arrows F3), resulting in a compression, and bilateral clamping of panel 11 at the top part of the section (arrows F4) take place simultaneously. Panel 11 is held in place manually during this final clamping operation.

Panel 11 is perfectly fixed and secured vertically in groove 14 in the desired position. The top part of support rail 12 can then be closed by a cover 38, 39 (FIG. 1) provided with a seal 40, the cover pressing on the two opposite surfaces of glass panel 11. Cover 38, 39 is preferably clip-fastened onto protuberances 41, 42 arranged at the apex of the two wings of the section.

The invention claimed is:

1. A fixing device of a panel in a receiving groove of a support rail in the form of a U-shaped section extending in the longitudinal direction, said receiving groove having a rounded bottom and with two divergent ramps arranged at the apex of two opposite internal lateral surfaces of the receiving groove, the fixing device comprising:
   a cradle having two wings straddling the bottom edge of the panel to snugly follow the shape of the rounded bottom of the receiving groove, allowing a rocking movement of the cradle in relation to the support rail for angular adjustment of the panel,
   two first positioning wedges arranged on respective sides of the panel, each first positioning wedge being in engagement with a corresponding ramp of the cradle,
   two second positioning wedges arranged on respective sides of the panel transversely against corresponding ones of said ramps of the receiving groove, each second positioning wedge being arranged above a corresponding one of the first positioning wedges,
   two adjustment screws arranged on respective sides of the panel, each adjustment screw being able to control movement of the corresponding first positioning wedge and of the corresponding second positioning wedge which are arranged on the same side of the panel,
   said first positioning wedges and said second positioning wedges being able to move along the corresponding ramps for bilateral clamping of the panel after said angular adjustment.

2. The fixing device according to claim 1, wherein each first positioning wedge comprises a tapped aperture in which a threaded part of the corresponding adjustment screw is pre-assembled, and an extension engaged vertically along the corresponding ramp of the cradle.

3. The fixing device according to claim 2, wherein each adjustment screw passes through a corresponding one of the second positioning wedges, each second positioning wedge comprising a counterbore housing a screw head of the corresponding adjustment screw.

4. The fixing device according to claim 1, wherein the first and second positioning wedges on each side of the panel are separated vertically from one another by a space, and move by sliding in two opposite directions when clamping by the corresponding adjustment screw is performed.

5. The fixing device according to claim 1, wherein the cradle and the first and second positioning wedges are made from plastic.

6. The fixing device according to claim 1, wherein a rocking amplitude of the cradle is limited by the first positioning wedges coming into engagement against the two opposite internal lateral surfaces of the receiving groove, and stops are configured to prevent the cradle from riding up when clamping of the adjustment screws is performed.

7. A guard rail comprising a panel inserted in a support rail, wherein the panel is secured in the support rail by the fixing device according to claim 1.

8. The guard rail according to claim 7, wherein the cradle, the two first positioning wedges and the two second positioning wedges constitute a wedging module with the two adjustment screws, the panel being secured by a plurality of such wedging modules.

9. The guard rail according to claim 8, wherein the wedging modules are pre-assembled on the bottom part of the panel in a state before insertion in the receiving groove of the support rail.

10. The guard rail according to claim 8, wherein the wedging modules are inserted in the receiving groove of the support rail in a state before the panel is fitted in place.

* * * * *